Sept. 23, 1947.            C. F. JENKINS                 2,427,729
                       BATTERY CHARGING SYSTEM
                         Filed March 23, 1945
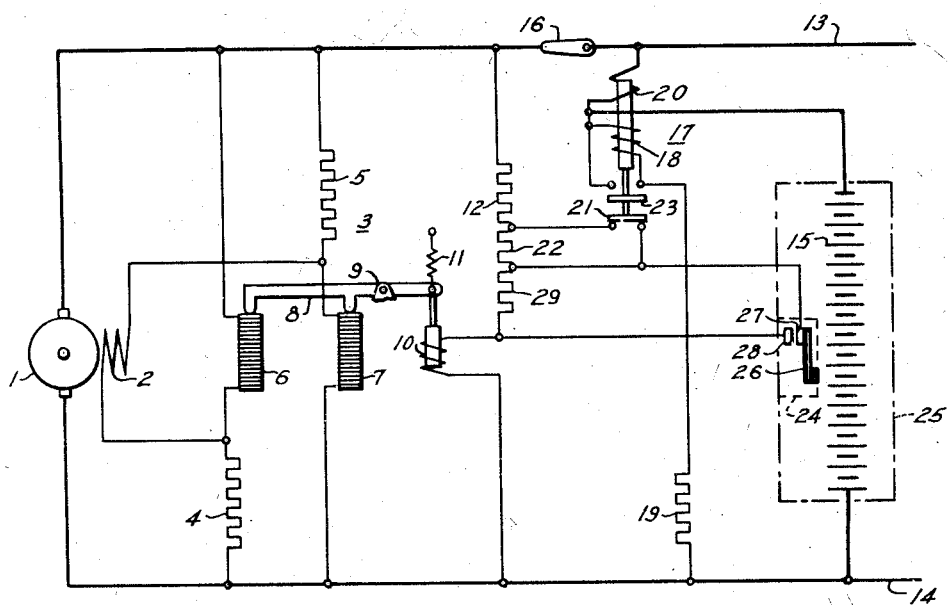
WITNESSES:                                          INVENTOR
                                              Charles F. Jenkins.
                                              BY
                                                   ATTORNEY Patented Sept. 23, 1947

2,427,729

UNITED STATES PATENT OFFICE 2,427,729

BATTERY CHARGING SYSTEM

Charles F. Jenkins, Laughlintown, Pa., assignor to Westinghouse Electric Corporation, East Pittsburgh, Pa., a corporation of Pennsylvania Application March 23, 1945, Serial No. 584,264

10 Claims. (Cl. 320—22)

1

The present invention relates to battery-charging systems and, more particularly, to such systems of the type used on railway cars, and other vehicles.

The electrical systems used on railway passenger cars for supplying the air-conditioning equipment, lights, and other loads include a generator driven from an axle of the car and a battery, which supplies the load when the car is standing still or running at low speeds. At higher speeds, when the generator voltage is high enough to supply the load, the battery floats across the line and is charged by the generator. It has been found to be impossible to select a single value of generator voltage which is high enough to keep the battery in a good state of charge, but which is low enough to avoid danger of overcharging, with resultant gassing and damage to the battery. For this reason, a two-voltage system is usually used. In such a system, a relatively high voltage is applied to the battery for charging and, when the battery is fully charged, or almost fully charged, the voltage is reduced to a value at which the battery can safely be floated across the line. This change in voltage is most readily effected by means of a so-called battery-taper relay, which is actuated in response to the battery current to cause the higher voltage to be applied to the battery when the battery charging current exceeds a predetermined value, indicating that the battery is discharged, and which reduces the voltage when the battery current decreases below a lower predetermined value, indicating that the battery is charged, or nearly charged. In this way, the battery can be kept in a good state of charge, without danger of overcharging under usual conditions.

There is another condition, however, which has not heretofore been recognized, and which may seriously affect the life of lead-acid batteries. Railway car batteries are usually placed in a box or case, which is secured to the underside of the car body, and the battery is, therefore, subjected to the ambient temperature under the car. In hot weather and in those parts of the country in which high temperatures are common, the ambient temperature under the car may be quite high and, in case of long runs over hot road-beds, the temperature under the car sometimes becomes as high as 50° C. When a lead-acid battery is approaching a condition of full charge, if the ambient temperature to which the battery is subjected reaches or exceeds a certain critical value, the charging current ceases to decrease and actually increases, and it is not uncommon, under the conditions mentioned above, for this critical value to be exceeded. If this occurs, with the type of battery-charging system described above, the taper relay will not operate, since its operation to reduce the voltage applied to the battery depends on the decrease in charging current, and thus the high charging voltage continues to be applied to the battery even though it is already fully charged. This causes overcharging with serious damage to the battery, and may result in very short battery life.

The principal object of the present invention is to provide a battery-charging system in which the voltage applied to the battery is automatically reduced when the ambient temperature to which the battery is subjected exceeds a predetermined value.

A further object of the invention is to provide a battery-charging system of the type in which a relatively high voltage is applied to the battery for charging, and reduced to a lower value when the battery is fully charged, and in which the voltage applied to the battery is automatically reduced when the ambient temperature to which the battery is subjected exceeds a predetermined value, independently of the operation of other parts of the system.

Further objects and advantages of the invention will be apparent from the following detailed description, taken in connection with the accompanying drawing, the single figure of which is a schematic wiring diagram, showing a preferred embodiment of the invention.

The invention is shown in the drawing as applied to a railway-car battery-charging system which includes an axle-driven generator 1, which may be of any suitable type, and which has a field winding 2. The voltage of the generator 1 is controlled by a voltage regulator 3, which may also be of any suitable type. The particular regulator 3 shown in the drawing consists of two fixed resistors 4 and 5 and two variable resistors 6 and 7, connected in a bridge circuit across the terminals of the generator 1. The field winding 2 is connected, as shown, across the diagonal of the bridge circuit, and it will be apparent that, by varying the resistances of the variable resistors 6 and 7, the current in the field winding 2 can be varied over a wide range, to keep the generator voltage constant, or substantially constant, over a wide range of generator speed. The variable resistors 6 and 7 have been shown as carbon-pile resistors, and their resistances may be simultaneously varied by means of a pressure member 8, of any suitable type, which is pivoted at 9 and actuated by means of a coil 10, acting in opposition to a spring 11. The voltage regulator coil 10 is connected across the generator voltage in series with a resistor 12, and it will be apparent that any change in the generator voltage will cause movement of the pressure member 8 to change the resistance of the resistors 6 and 7, and thus change the current in the field winding 2 to bring the generator voltage back to its desired value, the magnitude of the regulated voltage being determined by the resistance of the resistor 12.

The generator 1 is connected to the line 13, 14 which supplies the air-conditioning equipment, lights, and other loads on the car, and a battery 15 is connected across the line to be charged by the generator 1 and to supply the load when the car is standing still or running at low speeds. The generator 1 is preferably connected to the line 13, 14 by means of a switch, or contactor, indicated diagrammatically at 16, which may be controlled by a reverse-current relay of any suitable or usual type to connect the generator to the line when its voltage exceeds the battery voltage, and to disconnect the generator when its voltage falls below the battery voltage.

The system shown in the drawing is a two-voltage system, as described above, and the voltage applied to the battery is controlled by means of a battery-taper relay 17 which, in effect, controls the setting of the voltage regulator 3. The taper relay 17 has been shown as a relay of the type described and claimed in a patent to D. W. Exner, No. 2,165,040, issued July 4, 1939, and assigned to the Westinghouse Electric & Manufacturing Company. As more fully described in that patent, the relay 17 has a shunt or voltage coil 18, which may be responsive to either the generator voltage or the battery voltage, and which is shown as being connected across the battery, preferably in series with a resistor 19. The relay 17 also has a series or current coil 20 connected in series with the battery 15, to carry the battery current. The relay 17 has a normally closed contact 21, which is connected to short-circuit a portion 22 of the resistor 12, and also has a normally open contact 23, which short circuits and deenergizes the shunt coil 18 when the relay is actuated.

The shunt coil 18 and series coil 20 of the taper relay 17 are wound so that their effect is additive when current is flowing to the battery through the coil 20 in the charging direction. Thus, the shunt coil 18 aids the current coil 20 to actuate the relay and, when the charging current flowing to the battery exceeds a predetermined value, which indicates that the battery is discharged, the relay 17 picks up and opens the contact 21, thus inserting the resistance 22 in series with the voltage regulator coil 10. This has the effect of changing the setting of the voltage regulator 3 and causes a higher voltage to be applied to the battery 15 for charging. When the relay 17 picks up, the contact 23 closes and deenergizes the shunt coil 18. The current flowing to the battery through the series coil 20, however, is sufficient to hold the relay 17 in its actuated position, and thus the high charging voltage is maintained. As the battery becomes more fully charged, the charging current decreases, and, when it has fallen to a value somewhat lower than the value which caused the relay to pick up, the current becomes insufficient to hold the relay in its actuated position and it drops out, closing the contact 21 and short-circuiting the resistance 22, which causes the voltage regulator 3 to reduce the voltage applied to the battery. Thus, the taper relay 17 functions to control the voltage applied to the battery 15 in response to the battery current, which is utilized as an indication of the state of charge of the battery. The relay 17 is prevented from picking up in response to a heavy discharge current flowing from the battery to the system, since the current is reversed with respect to the battery when it is discharging, and the coils 18 and 20 of the relay therefore oppose each other when the battery is discharging so that operation of the relay 17 is prevented, as more fully explained in the above-mentioned Exner patent.

As previously stated, if a battery of the lead-acid type is subjected to a temperature above a certain critical value when it is being charged and is approaching full charge, the charging current ceases to decrease and may actually increase. Thus, if the temperature to which the battery 15 is subjected becomes too high, the charging current flowing to the battery will not decrease to the value at which the taper relay 17 drops out, and the relay 17 will remain in its actuated position, so that the high charging voltage continues to be applied to the battery. This may result in serious damage to the battery and greatly shortens its life.

In accordance with the present invention, the battery is protected against the continued application of high voltage resulting from the occurrence of this condition by means of a temperature-responsive device 24 which may be placed within the battery box 25, as shown, or in any other location where it is subjected to the same ambient temperature as the battery 15, or to a temperature which is very close to that temperature. Thus, the temperature-responsive device 24 might be placed on the outside of the battery box, or attached to one of the cells of the battery 15, or it might be disposed so as to be responsive to the temperature of the battery itself. The temperature-responsive device 24 may be any suitable type of thermostatic device, and has been shown as comprising a bimetallic element 26 carrying a movable contact 27, which cooperates with a stationary contact 28. The contacts 27 and 28 are normally open, and are connected across a portion 29 of the resistor 12. When the temperature of the bimetallic element 26 exceeds the value for which it is adjusted, it closes the contacts 27 and 28, to short-circuit the resistance 29, and thus change the setting of the voltage regulator 3 so as to reduce the voltage applied to the battery 15 to a safe value. It will be noted that this action is entirely independent of the action of the taper relay 17, so that the battery is fully protected from the damaging effects which might be caused as a result of excessive ambient temperature. For example, the thermostat 24 may be set so as to close its contacts and reduce the voltage at an ambient temperature of about 30° C., and to open the contacts at a temperature of about 25° C., to permit the voltage to be increased. These temperatures are merely illustrative and may be varied by as much as 8° or 10°, depending upon the location of the thermostat and on the particular conditions to be met.

It should now be apparent that the present invention provides means for protecting the battery from overcharging as a result of the effect of high ambient temperatures. This result is obtained in a very simple manner by the use of a temperature-responsive device, which controls the setting of the voltage regulator and is independent of the taper relay 17, so that the battery is positively protected, regardless of the operation of other parts of the system. Thus, one of the major causes of short battery life is eliminated, and the use of the temperature-responsive device 24, together with the taper relay 17, makes overcharging of the battery practically impossible under any conditions of operation. Another advantage of the invention is that the battery can be kept in a better average state of charge than has heretofore been possible, since the value of the charging voltage can be set higher than would otherwise be possible, so as to charge the battery at a higher rate when it is cool enough to take the charge without damage. Thus, the average state of charge of the battery can be kept higher than would otherwise be possible, since the arrangement of the present invention positively protects it against the danger of overcharging when the battery is hot.

A preferred embodiment of the invention has been shown and described for the purpose of illustration, but it will be apparent that various other modifications and embodiments are possible. Thus, the thermostatic device 24 might also be used to advantage in systems which do not employ the taper relay 17, to protect the battery against overcharging. It is to be understood, therefore, that the invention is not limited to the particular arrangement shown and described; but, in its broadest aspects, it includes all equivalent embodiments and modifications which come within the scope of the appended claims.

I claim as my invention:

1. A battery-charging system comprising a variable-voltage source of direct current, voltage-regulating means for said source, means for connecting a battery to said source to be charged thereby, relay means for causing a relatively high voltage to be applied to the battery for charging when the battery current exceeds a predetermined value and for effecting a reduction in the voltage when the battery current falls below a lower predetermined value, and temperature-responsive means for effecting a reduction in the voltage applied to the battery when the ambient temperature adjacent the battery exceeds a predetermined value.

2. A battery-charging system comprising a variable-voltage source of direct current, voltage-regulating means for said source, means for connecting a battery to said source to be charged thereby, relay means for controlling the action of said voltage-regulating means to cause a relatively high voltage to be applied to the battery for charging when the battery current exceeds a predetermined value and for causing a reduction in the voltage when the battery current falls below a lower predetermined value, and temperature-responsive means for controlling the action of said voltage-regulating means, said temperature-responsive means being adapted to effect a reduction in the voltage applied to the battery independently of the action of said relay means when the ambient temperature adjacent the battery exceeds a predetermined value.

3. Control means for a battery-charging system which includes a variable-voltage source of direct current, voltage-regulating means for said source and means for connecting a battery to the source to be charged thereby, said control means including relay means for controlling the action of said voltage-regulating means to cause a relatively high voltage to be applied to the battery for charging and to reduce the voltage when the battery approaches full charge, and temperature-responsive means for controlling the action of the voltage-regulating means, said temperature-responsive means being disposed to be responsive to the ambient temperature adjacent the battery and being adapted be effect a reduction in the voltage applied to the battery independently of the action of said relay means when said ambient temperature exceeds a predetermined value.

4. A battery-charging system comprising a variable-voltage source of direct current, voltage-regulating means for said source, means for connecting a battery to said source to be charged thereby, relay means for causing a relatively high voltage to be applied to the battery for charging when the battery current exceeds a predetermined value and for effecting a reduction in the voltage when the battery current falls below a lower predetermined value, and temperature-responsive means for effecting a reduction in the voltage applied to the battery when the temperature of the battery exceeds a predetermined value.

5. A battery-charging system comprising a variable-voltage source of direct current, voltage-regulating means for said source, means for connecting a battery to said source to be charged thereby, relay means for controlling the action of said voltage-regulating means to cause a relatively high voltage to be applied to the battery for charging when the battery current exceeds a predetermined value and for causing a reduction in the voltage when the battery current falls below a lower predetermined value, and temperature-responsive means for controlling the action of said voltage-regulating means, said temperature-responsive means being adapted to effect a reduction in the voltage applied to the battery independently of the action of said relay means when the temperature of the battery exceeds a predetermined value.

6. A battery-charging system comprising a variable-voltage source of direct current, voltage-regulating means for said source, means for connecting a battery to said source to be charged thereby, means for causing a relatively high voltage to be applied to the battery for charging when the battery is discharged and for effecting a reduction in the voltage when the battery approaches fully charged condition, and temperature-responsive means for effecting a reduction in the voltage applied to the battery independently of the action of the last-mentioned means when the ambient temperature adjacent the battery exceeds a predetermined value.

7. A battery-charging system comprising a variable-voltage source of direct current, voltage-regulating means for said source, means for connecting a battery to said source to be charged thereby, means for controlling the action of said voltage-regulating means to cause a relatively high voltage to be applied to the battery for charging when the battery is discharged and to cause a reduction in the voltage when the battery approaches fully charged condition, and temperature-responsive means for controlling the action of the voltage-regulating means independently of said last-mentioned controlling means, said temperature-responsive means being adapted to effect a reduction in the voltage applied to the battery when the ambient temperature adjacent the battery exceeds a predetermined value.

8. Control means for a battery-charging system which includes a variable-voltage source of direct current, voltage-regulating means for said source and means for connecting a battery to the source to be charged thereby, said control means including relay means for controlling the action of said voltage-regulating means to cause a relatively high voltage to be applied to the battery for charging and to reduce the voltage when the battery approaches full charge, and temperature-responsive means for controlling the action of the voltage-regulating means, said temperature-responsive means being disposed to be responsive to the temperature of the battery and being adapted to effect a reduction in the voltage applied to the battery independently of the action of said relay means when the temperature of the battery exceeds a predetermined value.

9. Control means for a battery-charging system which includes a variable-voltage source of direct current, voltage-regulating means for said source and means for connecting a battery to the source to be charged thereby, said control means including means for causing a relatively high voltage to be applied to the battery for charging when the battery is discharged and for effecting a reduction in the voltage when the battery approaches fully charged condition and temperature-responsive means for effecting a reduction in the voltage applied to the battery independently of the action of the last-mentioned means when the ambient temperature adjacent the battery exceeds a predetermined value.

10. Control means for a battery-charging system which includes a variable-voltage source of direct current, voltage-regulating means for said source and means for connecting a battery to the source to be charged thereby, said control means including means for controlling the action of the voltage-regulating means to cause a relatively high voltage to be applied to the battery for charging when the battery is discharged and to cause a reduction in the voltage when the battery approaches fully charged condition, and temperature-responsive means for controlling the action of the voltage-regulating means independently of the action of said last-mentioned controlling means, said temperature-responsive means being adapted to effect a reduction in the voltage applied to the battery when the ambient temperature adjacent the battery exceeds a predetermined value.

CHARLES F. JENKINS.

REFERENCES CITED

The following references are of record in the file of this patent:

UNITED STATES PATENTS

| Number | Name | Date |
|---|---|---|
| 1,186,158 | Anderson | June 6, 1916 |
| 1,284,616 | Ditzler et al. | Nov. 12, 1918 |
| 1,314,629 | Andres | Sept. 2, 1919 |
| 1,325,597 | Turbayne | Dec. 23, 1919 |
| 1,392,252 | Delano | Sept. 27, 1921 |
| 1,434,728 | Arendt et al. | Nov. 7, 1922 |
| 1,440,879 | Lee et al. | Jan. 2, 1923 |
| 1,976,404 | Leingang | Oct. 9, 1934 |
| 2,165,040 | Exner | July 4, 1939 |
| 2,244,307 | Menzel | June 3, 1941 |
| 2,355,488 | Van Vulpen et al. | Aug. 8, 1944 |

FOREIGN PATENTS

| Number | Country | Date |
|---|---|---|
| 288,363 | Great Britain | Apr. 5, 1928 |
| 474,398 | Great Britain | Nov. 1, 1937 |
| 545,705 | Great Britain | June 8, 1942 |
| 316,714 | Germany | Dec. 1, 1919 |